US007966603B2

(12) United States Patent
Brunswig et al.

(10) Patent No.: US 7,966,603 B2
(45) Date of Patent: Jun. 21, 2011

(54) SYSTEMS AND METHODS FOR CONTEXT-BASED CONTENT MANAGEMENT

(75) Inventors: Frank Brunswig, Walldorf (DE); Ralf M. Rath, Walldorf (DE)

(73) Assignee: SAP, AG, Walldorf (DE)

( * ) Notice: Subject to any disclaimer, the term of this patent is extended or adjusted under 35 U.S.C. 154(b) by 1132 days.

(21) Appl. No.: 11/588,532

(22) Filed: Oct. 27, 2006

(65) Prior Publication Data

US 2008/0120597 A1    May 22, 2008

(51) Int. Cl.
 *G06F 9/44* (2006.01)
(52) U.S. Cl. .................................................. 717/120
(58) Field of Classification Search ........... 717/120–123
See application file for complete search history.

(56) References Cited

U.S. PATENT DOCUMENTS

| | | | |
|---|---|---|---|
| 5,659,735 A * | 8/1997 | Parrish et al. ......................... 1/1 |
| 6,098,072 A * | 8/2000 | Sluiman et al. ....................... 1/1 |
| 6,564,222 B1 * | 5/2003 | Sassano ......................... 707/736 |
| 7,124,400 B2 * | 10/2006 | Mortensen et al. ........... 717/121 |
| 7,424,685 B2 * | 9/2008 | Behrens et al. ................ 715/777 |
| 7,584,207 B2 * | 9/2009 | Mortensen et al. .................... 1/1 |
| 7,631,257 B2 * | 12/2009 | Kogan et al. ................... 715/239 |
| 7,676,801 B1 * | 3/2010 | Garthwaite .................... 717/165 |
| 7,743,386 B2 * | 6/2010 | Beunings et al. ............. 719/315 |
| 2003/0159035 A1 * | 8/2003 | Orthlieb et al. ............... 713/168 |
| 2004/0177339 A1 * | 9/2004 | Plaisted et al. ................ 717/116 |
| 2004/0181773 A1 * | 9/2004 | Mortensen et al. ........... 717/101 |

* cited by examiner

*Primary Examiner* — Anna Deng
*Assistant Examiner* — Qing Chen
(74) *Attorney, Agent, or Firm* — Mintz, Levin, Cohn, Ferris, Glovsky and Popeo, P.C.

(57) ABSTRACT

Systems and methods are provided for managing content. In one implementation a system includes software constructs, each being associated with a context defining a class of content modules included in a respective construct. In the system, a context is selected and context data for a plurality of content modules is retrieved. The context data includes a primary context identifier that identifies the context in which each content module was created or modified. In addition, the context data includes at least one secondary context identifier identifying additional contexts in which the content module is permitted to be included. Based upon the context identifiers, it is determined whether a content module is permitted in the selected context and a collection of modules is generated including the content modules permitted in the selected context based on the determination.

19 Claims, 10 Drawing Sheets

| ID | CONTEXT | BASE CONTEXT | BASE ID | REF-COUNT | RESTRICTION |
|---|---|---|---|---|---|
| 001 | A B C | A | | 6 | NONE |

FIG. 3A

SYSTEMS AND METHODS FOR CONTEXT-BASED CONTENT MANAGEMENT

TECHNICAL FIELD

Systems and methods consistent with the present invention relate to software content management, including content management for providing and managing software. More particularly, the invention relates to methods and systems for providing context-based management of software content.

BACKGROUND INFORMATION

In today's marketplace, software providers (i.e., developers and vendors) offer various types of software to members of the public. This software often includes content that was originally created for another software application. However, as content is duplicated or modified for different applications, management of the content becomes more difficult. In some cases, the software provider may need to restrict the availability or visibility of content to certain applications or customers. For example, based on the information of all content associated with an application, the software provider may wish to restrict content to certain software deployments. In other cases, the software provider may need to determine which content is used, duplicated and/or unused in a software release to the public. In still other cases, the content provider may wish to determine statistics about the usage of content in order to evaluate the importance or value of particular content.

Few tools are available for managing content that has been duplicated or modified. Current constraints for the use and reuse of content are not sufficient for a complex content management system. Consequently, it may be quite cumbersome for a provider to determine which content is actually used by a software application. Further, without knowledge of whether an application uses certain content, there is no efficient mechanism to eliminate unused content in a software application. Moreover, there is no convenient means to determine how valuable certain content is based on its use and reuse in various scenarios and applications.

Accordingly, in view of the foregoing, there is a need for systems and methods for providing software that overcomes one or more of the above-noted problems and/or disadvantages.

SUMMARY OF THE INVENTION

Embodiments consistent with the present invention provide methods and systems for managing software content. Further, in accordance with aspects of the invention, the software may correspond to any type of application, software package, or framework.

In one implementation, a system includes software constructs and each construct is associated with a context defining a class of content modules included in a respective construct. In the system, a context is selected and context data for a plurality of content modules is retrieved. The context data includes a primary context identifier that identifies the context in which each content module was created or modified. In addition, the context data includes at least one secondary context identifier identifying additional contexts in which the content module is permitted to be included. Based upon the context identifiers, it is determined whether each content module is permitted in the selected context and a collection of modules is generated including the content modules permitted in the selected context based on the determination.

In another embodiment of the invention, access to content may be restricted based on context data.

In another embodiment of the invention, content may be identified as valuable based on context data.

In yet another embodiment of the invention, content may be deleted based on context data.

In yet another embodiment, the contexts define a class of content included in a particular deployment of a software construct.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIGS. 3A, 3B and 3C provide block diagrams illustrating exemplary data structures, consistent with an embodiment of the present invention;

DETAILED DESCRIPTION

The following detailed description of embodiments of the present invention refers to the accompanying drawings. Where appropriate, the same reference numbers in different drawings refer to the same or similar elements.

Context-based content management enables management of software content modules based on the usage of content in different scenarios and applications. A content module may be discrete unit of computer-readable data arrangement, such as a software application, a set of instructions, a document, a record, data and/or metadata. A context may relate a content module to a software construct including one or more modules such as, for example, scenario, framework, document template, application, application, layer, feature or function of software. Context data associated with first a content module may be inherited by second a content module which was created (e.g., produced, duplicated or modified) based on the first content module. By associating data describing this context with each content module, context-based content management may be implemented.

Figure 1:
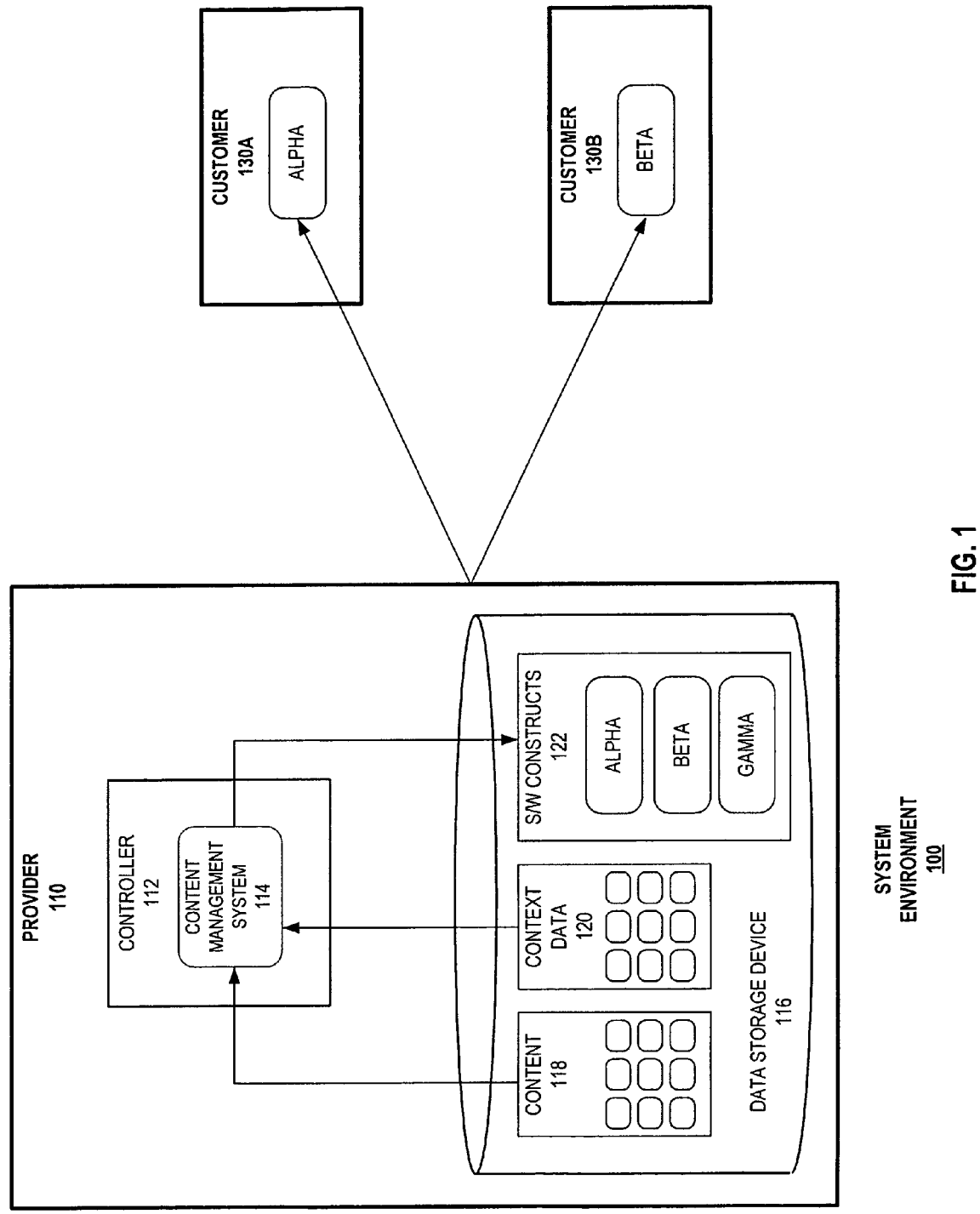
FIG. 1 provides a block diagram illustrating an exemplary system environment, consistent with an embodiment of the present invention.

FIG. 1 is a block diagram of an exemplary system environment 100, consistent with an embodiment of the present invention. As shown, system environment 100 may include a provider 110 that may communicate with customers 130A and 130B. Provider 110 may, for example, provide software and/or applications for use by customers 130. Software constructs Alpha, Beta and Gamma may be applications hosted by provider 110 for use by customers 130 and provided over a network, such as the Internet. Alternatively, these constructs may be document templates for generating documents from content included within a document management system.

Provider 110 may include controller 112 and data storage device 116. Controller 112 may have a data processor for processing computer-readable instructions and/or data consistent methods and systems of the present invention. As shown in FIG. 1, controller may execute a content management system 114 for managing content modules 118, context data 120 and software constructs 122. Content management system 114 may also perform other content management activities, such as updating or replacing software, or backing-up and recovering data.

Data storage device 116 may be a device for storing computer-readable data including, for example, modules 001-012 and software constructs Alpha, Beta, and Gamma. Data storage device 116 may be implemented with a variety of components or subsystems including, for example, a magnetic disk drive, an optical disk drive, flash memory, or other devices capable of storing information. Further, although data storage device 116 is shown as being located at provider 110, data storage device 116 may located remotely. For instance, data storage device 116 may be located at customer 130 or vendor 140, or it may be configured as network attached storage (NAS) device or a storage device attached by a storage area network (SAN). Furthermore, although FIG. 1 illustrates modules 001-012 stored within a single data storage device for simplicity, modules 001-012 may be stored at a variety of locations locally and remotely from data storage device 116 including at customer 130, vendor 140, or remotely stored on Network.

In addition, provider 110 may include other controllers and applications. For example, provider 110 may have network server for processing instructions for hosting customers 130 over a network, administering and maintaining constructs (e.g., applications), and/or controlling application servers, databases, and process upon which the constructs rely.

Customers 130 may be associated with each customer of provider 110 that acquires (i.e., accesses, downloads, purchases, leases, licenses) software from provider 110. Customers 130 may be any device, system, or entity using the software provided by provider 110. Customer 130 may include a customer terminal 132 enabling a users to access or execute software constructs 122 provided by provider 110. Customer terminal 132 may be implemented as one or more computer systems including, for example, a personal computer, minicomputer, microprocessor, workstation, mainframe or similar computer platform typically employed in the art.

For instance, in some embodiments, provider 110 and customer 130 and may have a network client-server relationship in which, instead of maintaining the software entirely on the customers' 130 systems, customers 130 may rely on provider 110 to host, in whole or in part, software constructs 122 and their related data or content. The network may include one or more communication networks that communicate applications and/or data between provider 110, customer 130 and vendor 140. The particular composition and protocol of the network is not critical as long as it allows for communication between provider 110 and customers 130.

In an alternative embodiment, instead of being hosted at provider 110 software constructs 122 may be stored and executed at customers 130. For instance, provider 110 and customer 130 may not communicate over network but instead, customer 130 may receive applications from provider 110 on computer-readable media.

The components illustrated in FIG. 1 and their respective relationships are exemplary. While FIG. 1, for purposes of illustration, shows only one provider 110 and two customers 130, system environment 100 may include any number of providers, customers, and networks. Furthermore, system environment 100 may include other entities, such as vendors that provide content or applications for provider 110 and customers 130.

Figure 2:
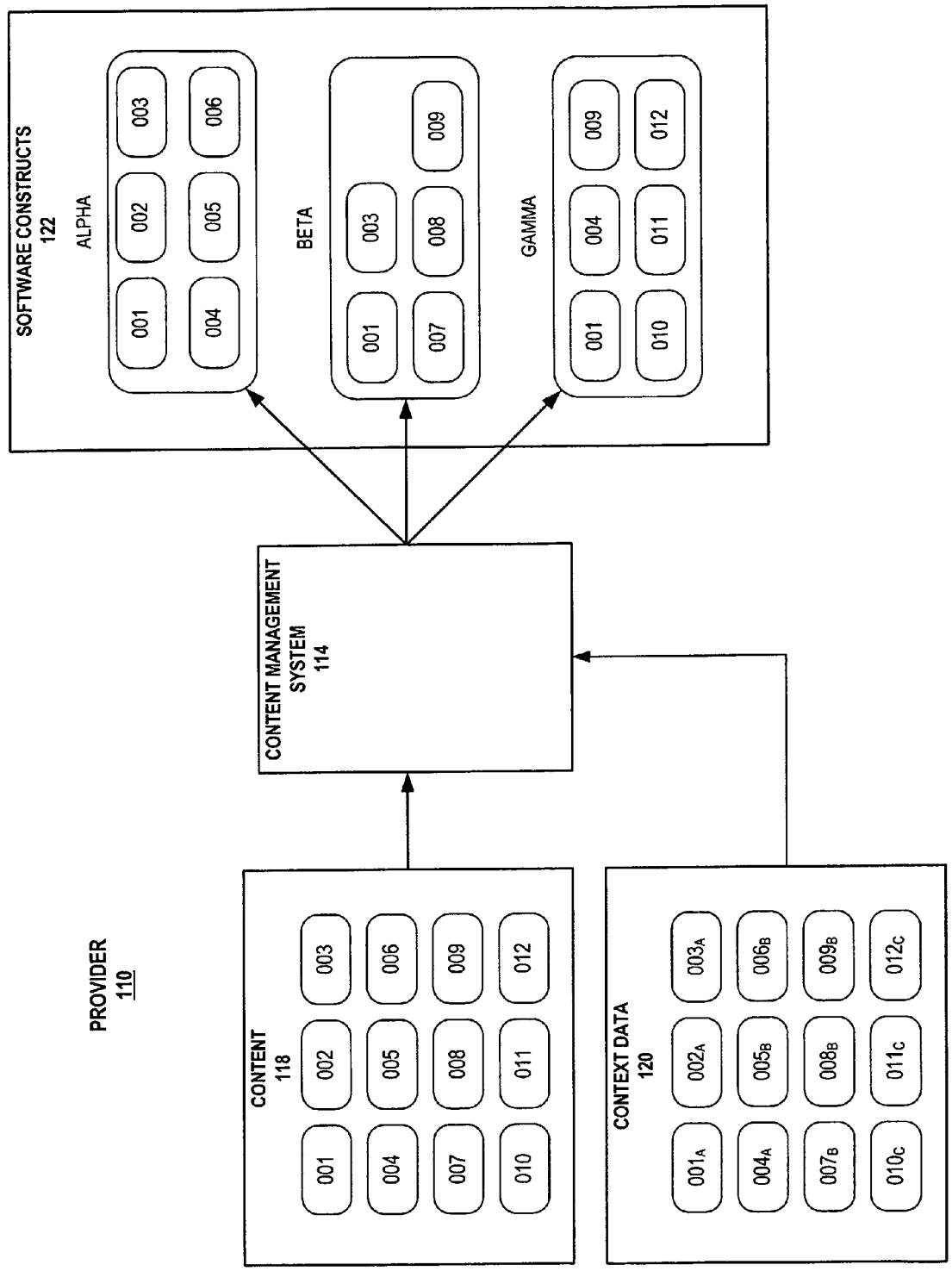
FIG. 2 provides an diagram illustrating an exemplary relationship between content, content modules, and software constructs, consistent with an embodiment of the present invention.

FIG. 2 provides a diagram illustrating an exemplary relationship between content management system 114, content 118, context data 120 and software constructs 122, consistent with an embodiment of the invention. In particular, FIG. 2 illustrates the processing of content modules 118 for software constructs Alpha, Beta and Gamma by content management system 114.

Content 118 may include content modules 001-012, which exemplify discrete units of computer-readable instructions and/or data that may be available within the system 100. Modules 001-012 may include any type of data arrangement for use within a software constructs 122. For example, content modules 001-012 may be tables, data fields, memo fields, fixed length fields, variable length fields, records, word processing templates, spreadsheet templates, database schema, indexes or metadata. Moreover, modules 001-012 may be software such as images, sounds, webpages, menus, dialogs, videos, help files, configuration data, roles or views. Furthermore, modules 001-012 may be portal content which is managed in a portal content directory like configuration data, documents, and business objects.

Modules 001-012 are illustrated in FIG. 2 by a respective unique identifier annotated with an associated primary context identifier. A primary context is the context of the software construct for which content was originally created, duplicated or modified. For example, module 001 is annotated in FIG. 2 with the letter "A" indicating that the primary context of modules 001 is context A (i.e., associated with software construct Alpha). In addition, as described further below, the primary context may also define a namespace from which modules 001-012 may be referenced within system 100 by the content management system 114.

As shown, software constructs 122 may include one or more of the modules 001-012 stored in data storage device 116. Software constructs 122 may be, for example, applications including a set of content that make up software for a customer 130 or other user, components within a software application, or stand-alone files of executable instructions. For instance, exemplary software constructs 122 may be components of an enterprise resource planning (ERP) system, software development tool and/or enterprise framework. Alternatively, software constructs 122 may be layers within a single application, a program, a software tool, or a function within a software program. Further, constructs 122 may represent different deployments of a single application, program, tool or function, each deployment representing a different collection of content.

Each of software constructs 122 may include one or more modules 001-012 specific to a respective software construct 122 and shared with other software constructs 122. For example, as shown in FIG. 2, module 001 is included in each of the software constructs Alpha, Beta and Gamma. In comparison, module 003 is only used in software construct Alpha.

By way of example, FIG. 2 illustrates which of modules 001-012 are included in each of software constructs Alpha, Beta and Gamma. Namely, software construct Alpha includes, at least, modules 001-006, each associated with primary context A. Further, software construct Beta includes, at least, modules 001, 003, 007, 008 and 009, wherein modules 001 and 003 have a primary context A, indicating that these content were originally created, duplicated or modified for use in software construct Alpha. In contrast, modules 007, 008 and 009 have primary context B, indicating that these content were originally created, duplicated or modified for use in software construct Beta. Furthermore, software construct Gamma includes, at least, modules 001, 004, 009, 010, 011 and 012, wherein modules 001 and 004 have primary context A, indicating that these content were originally created, duplicated or modified for use in software construct Alpha. Modules 009 has primary context B, indicating that this content was created software construct Beta, and modules 010, 011 and 012 have context C, indicating that these content where created in the context of software construct Gamma. As described in greater detail below, the associations between modules 001-012 and software constructs Alpha, Beta and Gamma enable content management based on the contexts in which modules 001-012 are created, modified and/or used.

Figure 3B:
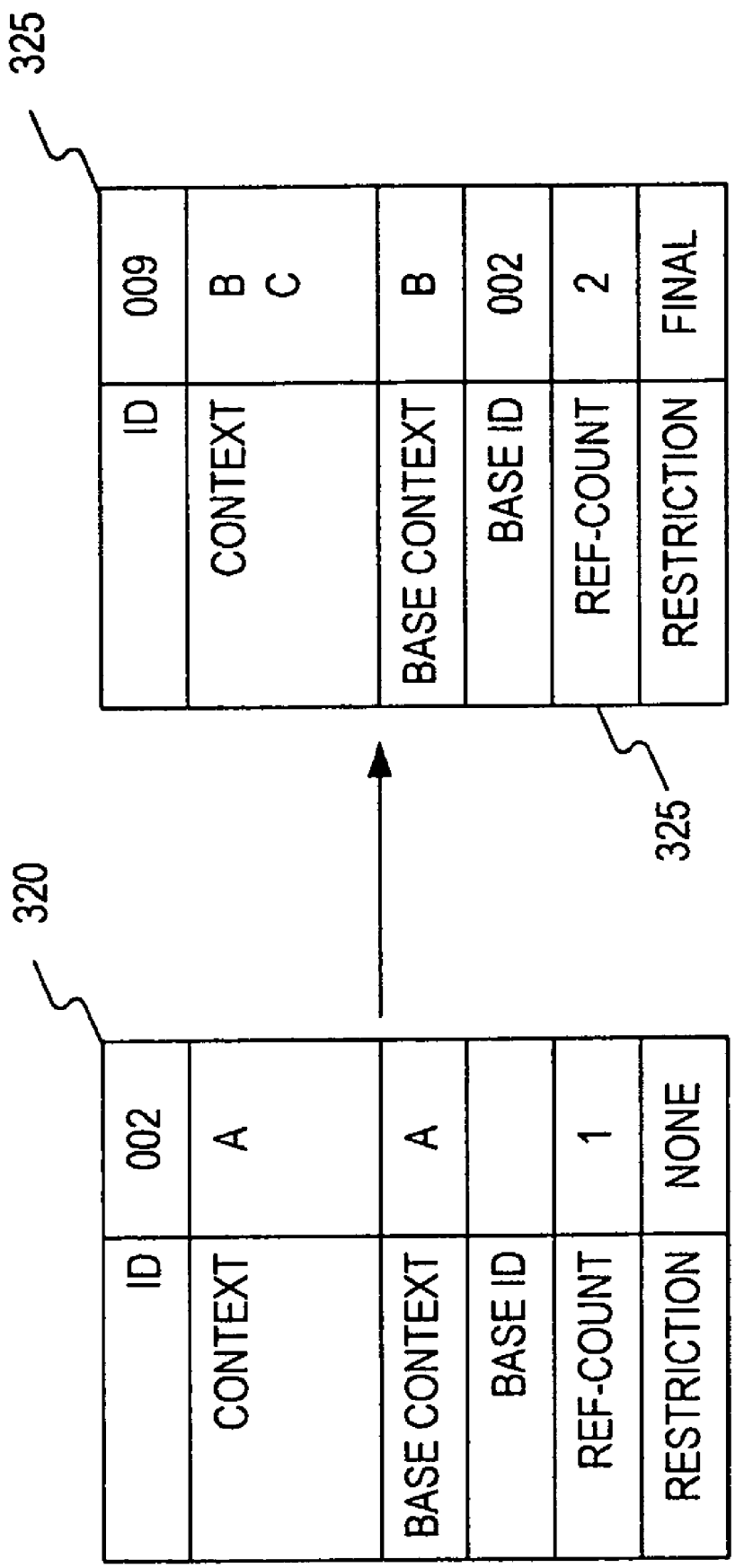
Figure 3C:
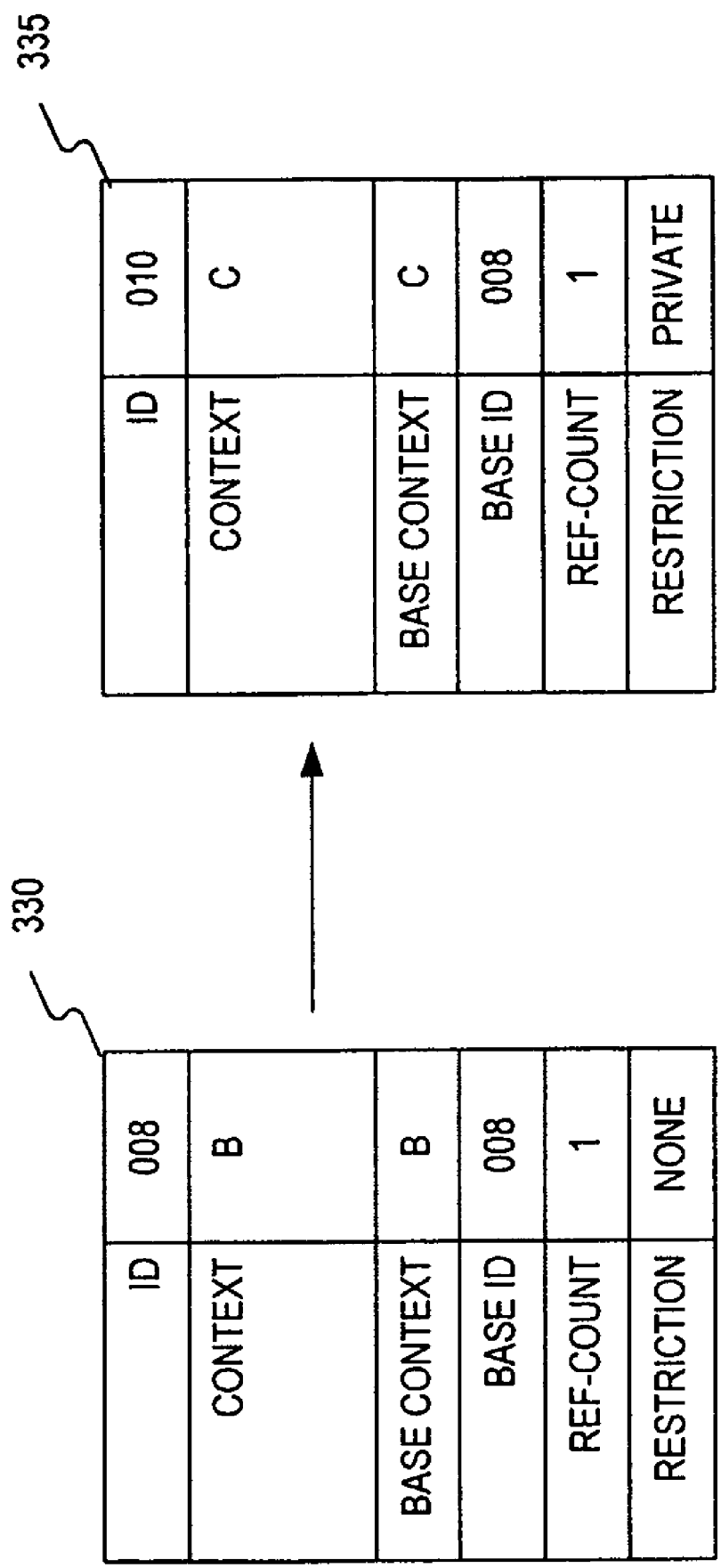

FIGS. 3A-3C illustrate exemplary context data 120 associated with modules 001-012. In general, a context is an abstract container filled by content associated with a common scenario, relationship or application within system 100. For example, as illustrated in FIG. 2, a context may relate modules 001-012 to one of software constructs Alpha, Beta or Gamma. A context cannot include more than one class; or in other words, a context may not have more than one meaning. For instance, system 100, in which content 118 is associated in the context of different software constructs 122, software constructs Alpha, Beta and Gamma cannot share the same context name. However, as shown in FIG. 2, the context of content included in software construct Beta may be inherited form content in context A. Furthermore, a context may use only parts of content from the context upon which the content is duplicated or modified.

Context data 120 may be stored as meta-data that is stored in associating with each of modules 001-012. In some cases, system 100 may include reference data associating each of modules 001-012 with a data file including the content's respective context data (e.g., data dictionary). In other cases, system 100 may store context data 120 in a data structure including a record for each of modules 001-012 (e.g., database or table). In some other cases, context data 120 may be directly stored with or within each content modules 001-012 (e.g., header data.)

As shown in FIGS. 3A-3C, context data 120 may include meta-data describing a content module 001-012, including: an identifier ("ID") of a content (e.g., 001-012), one or more contexts (e.g., A, B, and/or C), a primary context (e.g., A, B or C), base ID (e.g., 001-012), a reference count (i.e., "ref count") and one or more restrictions (e.g., final, deleted, private).

A content identifier may be assigned to each of modules 001-012 when the content is created or modified, for example, by a provider 110, customers 130. The identifier may enable the unique identification of modules 001-012 within system 100. For instance, the identifier may be a uniform resource identifier (URI), universally unique identifier (UUI) or a globally unique identifier (GUI). The identifier may comprise a name or address that can be used to refer to content over network. Accordingly, modules 001-012 may be addressed within system 100 by a logical name and not necessarily by a physical URI.

A base ID in context data associates content that was modified or appended with the content from which it was created. Content created in a context will contain the base ID as meta-data property and typically this base ID will be part of the universal resource identifier of these resources. As shown in FIG. 3B, if module 002 is modified for use in software construct Beta, then context data 325 is associated with a new ID 009. Furthermore, the Base ID is referenced to the ID of the original module 002.

Context data 120 identifies which content modules 001-012 are accessible and/or visible in a context. That is, based on context identifiers and restrictions in context data 120, access and visibility of modules 001-012 may be limited (e.g., denied or restricted). Content which is duplicated in a second software construct must be identified in the context of a first software construct if the content is to be available in the context of the second software construct. For instance, if context data 310 (FIG. 3A) associates modules 001 with contexts A, B and C, then module 001 may be visible and available to each of software constructs Alpha, Beta or Gamma, unless otherwise restricted. In comparison, as indicated in context data 320 (FIG. 3B), module 002 is available and visible only to software construct Alpha. However, if module 008 is modified in software construct Beta, as illustrated in FIG. 3C, then the modified module 010 (formally 008) is visible and available only in context C, associated with software construct Gamma.

A module's primary context identifies the context (and hence the software construct) for which the module was created, duplicated or modified. For instance, in FIG. 3B, context data 320 illustrates that module 002 is included in context A. Furthermore, the primary context of module 002 indicates that the content was also originally created, duplicated or modified in context A. However, as further shown in FIG. 3B, if modules 002 is modified in context B for inclusion in contexts B and C, then the primary context of new module 009 is context B.

A reference count associates a content module with the number of times the content has been accessed. For instance, the reference count for content 310 is six (6) which indicates that this content is used in six (6) instances in system 100. Based on reference count data, the value or importance of a particular content may be determined.

Restrictions identified in context data 120 enable additional content management of content 118 based on context. Restrictions may include, for example, final, private or deleted. Content 118 declared as "private" within context data may be only visible and available in the contexts identified in the context data 120. Content modules 001-012 declared as "final" in the context data 120 may be visible and available in secondary contexts, however, final content may not be modified for use in other software constructs, although it may be duplicated. Further, content 118 can be declared as "deleted." In this case, content 118 is not accessible in the primary context or any of the secondary contexts identified in the context data 120. Also, a content module cannot be deleted in the primary context if it is used in a secondary context. But, if some content is marked as deleted in the origin context, it is not visible in the primary context or in any secondary contexts.

Figure 4:
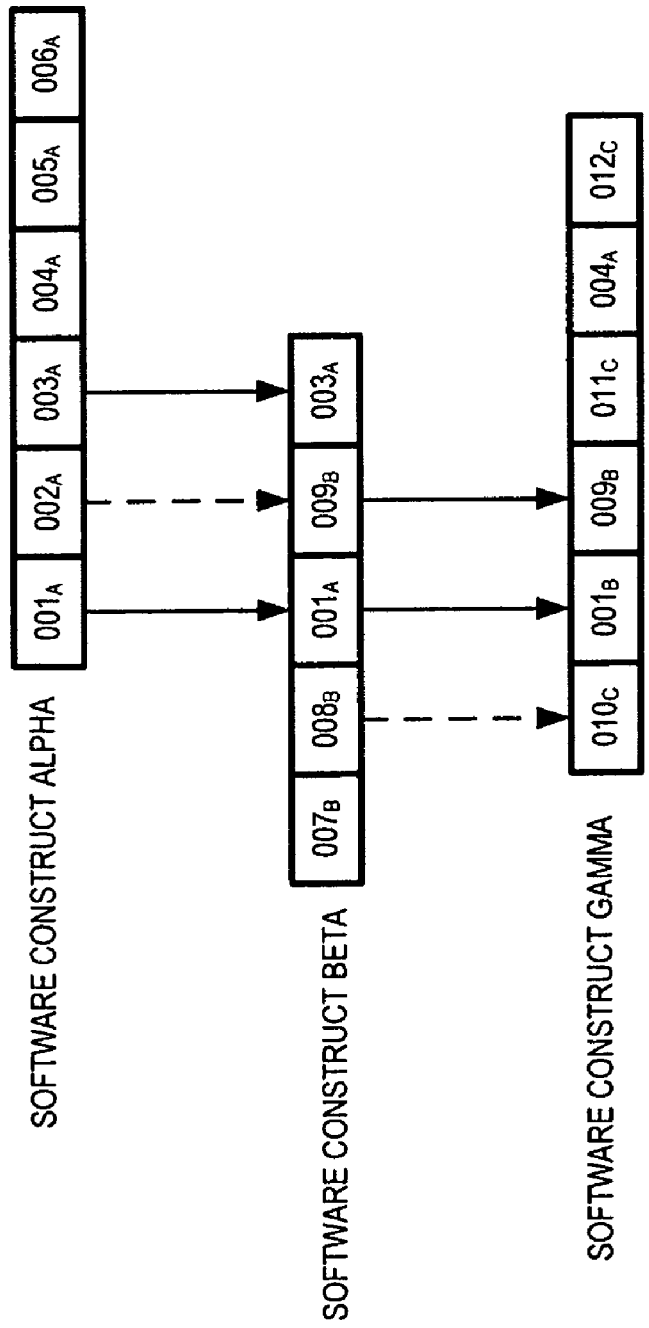
FIG. 4 provides a diagram illustrating exemplary relationships between contexts and content, consistent with an embodiment of the present invention.

FIG. 4, by way of example, provides a diagram illustrating the concept of content inheritance based on contexts. Each of modules 001-012 is associated with a contexts A, B or C are included in at least one of software constructs Alpha, Beta or Gamma, wherein the constructs are related in a hierarchical inheritance sequence. For instance, constructs Beta and Gamma may be successively derived from a construct Alpha, created as separate deployments for different customers or scenarios. As illustrated in FIG. 4, Beta is inferior in the inheritance sequence to Alpha. Also, Gamma is inferior to Alpha and Beta. The availability of an inherited module, however, may be restricted based on the contexts of the content superior in the inheritance sequence. As such, each layer may only access or view content that is created in the current layer or visible in that layer's immediate predecessor in the hierarchy. For example, module 001 may be inherited by Beta from Alpha. In addition, Gamma may inherit module 001 from Beta. Accordingly, module 001 is not available in software construct Gamma unless it is also available in Alpha and Beta. Similarly, because module 004 is not inherited Beta (i.e., Gamma's predecessor), this module also cannot inherited by Gamma from Alpha and, as a result, Gamma may not use module 004. In comparison, module 012 in Gamma is not included in Alpha or Beta and, therefore, the content is not limited by the content's availability content in the contexts of Alpha and Beta. Of course, subsequent usage of module 012 by other software constructs may limit the availability of content in Gamma.

Figure 5:
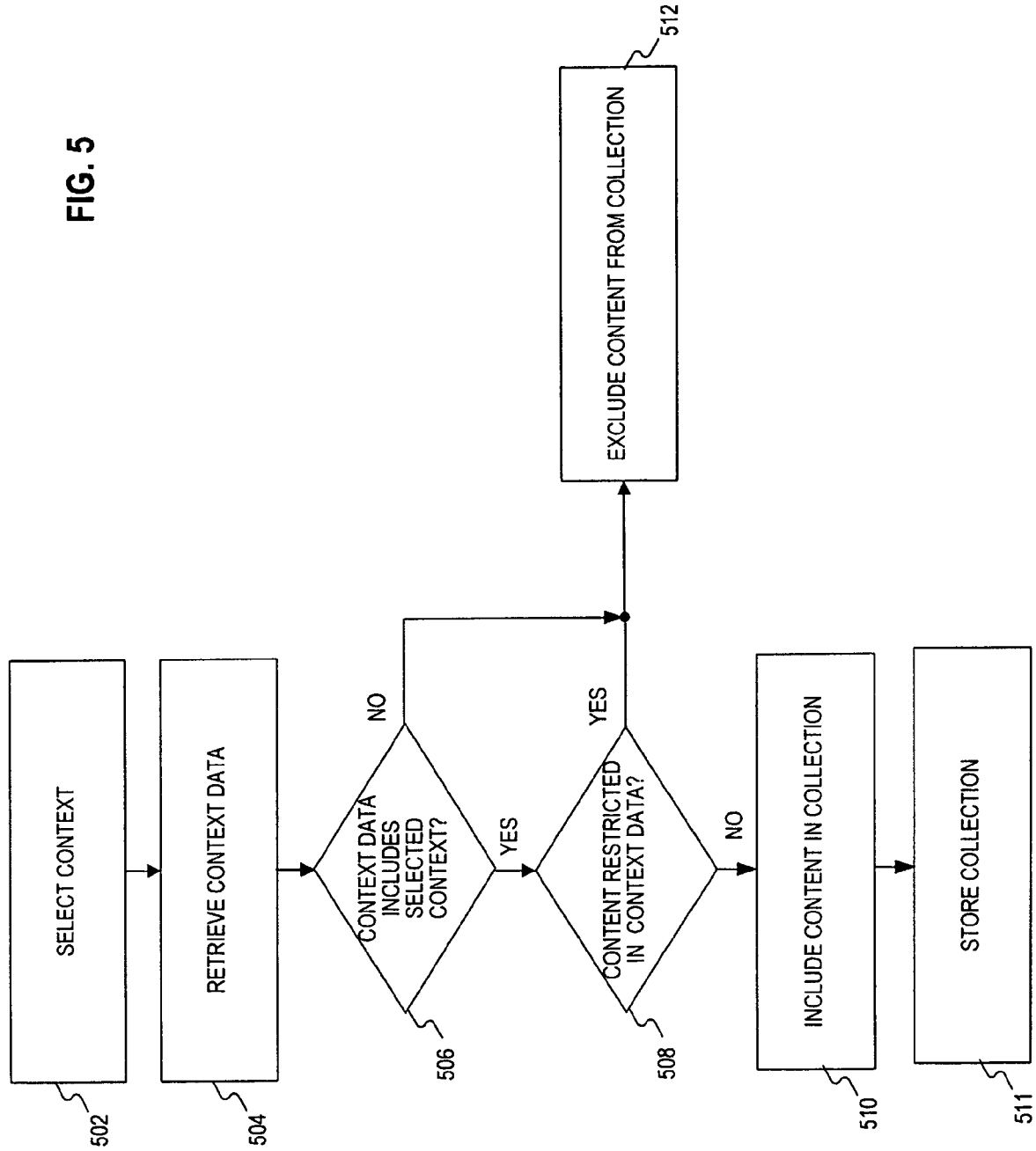
FIG. 5 provides a flowchart illustrating an exemplary method for managing content, consistent with an embodiment of the present invention.

FIG. 5 illustrates an exemplary method for managing content based on contexts, in accordance with an embodiment of the invention. First a context may be selected (Stage 502). For example, a software provider 110, using content management system 114, may select a context A, which may include all content used in a particular software construct Alpha representing, perhaps, a particular deployment of a software application.

Next, the context data 120 is retrieved (Stage 504) and, based on the context data 120 associated with each of content modules 001-012, it is determined which of the content modules 001-012 may be included the selected context (Stage 506). For example, content management system 114 may retrieve context data 325, associated with module 009. Because context data 325 includes context C (associated with software construct Gamma), software construct Gamma may, unless otherwise restricted, include content 009. However, because content 009 is not included in the context A, then inclusion of module 009 in software construct Alpha would not be permitted. Likewise, the module would not be available to any other software construct not identified in the context data 325.

Further, based on context data 120, it may also be determined whether access or visibility to the content module 001-012 is restricted. (Stage 508). If the context data 120 indicates that a module 001 is restricted, then access and visibility to the module may be restricted in the primary context, as well as all secondary contexts associated by inheritance. For example, if a restriction identifier indicates that one or more of content modules 001-012 is deleted, inclusion of the module in any of software constructs Alpha, Beta or Gamma would be denied (Stage 512). Alternatively, a restriction may indicate a content module is private. Private content may only be visible and accessible in the primary context or the secondary contexts identified in the context data 120.

Further, a restriction in context data may identify content as final. A module identified as final content may be visible and, therefore, included in other software constructs, however the content may only be modified in the primary context.

If the context data 120 includes the selected context, and the content module is not otherwise restricted in the context data 120, then the content may be included in the collection of content based on the selected context (Stage 510). The generated collection of content modules may be stored, for instance, for later retrieval or deployment to a customer 130 (Stage 511).

Figure 6:
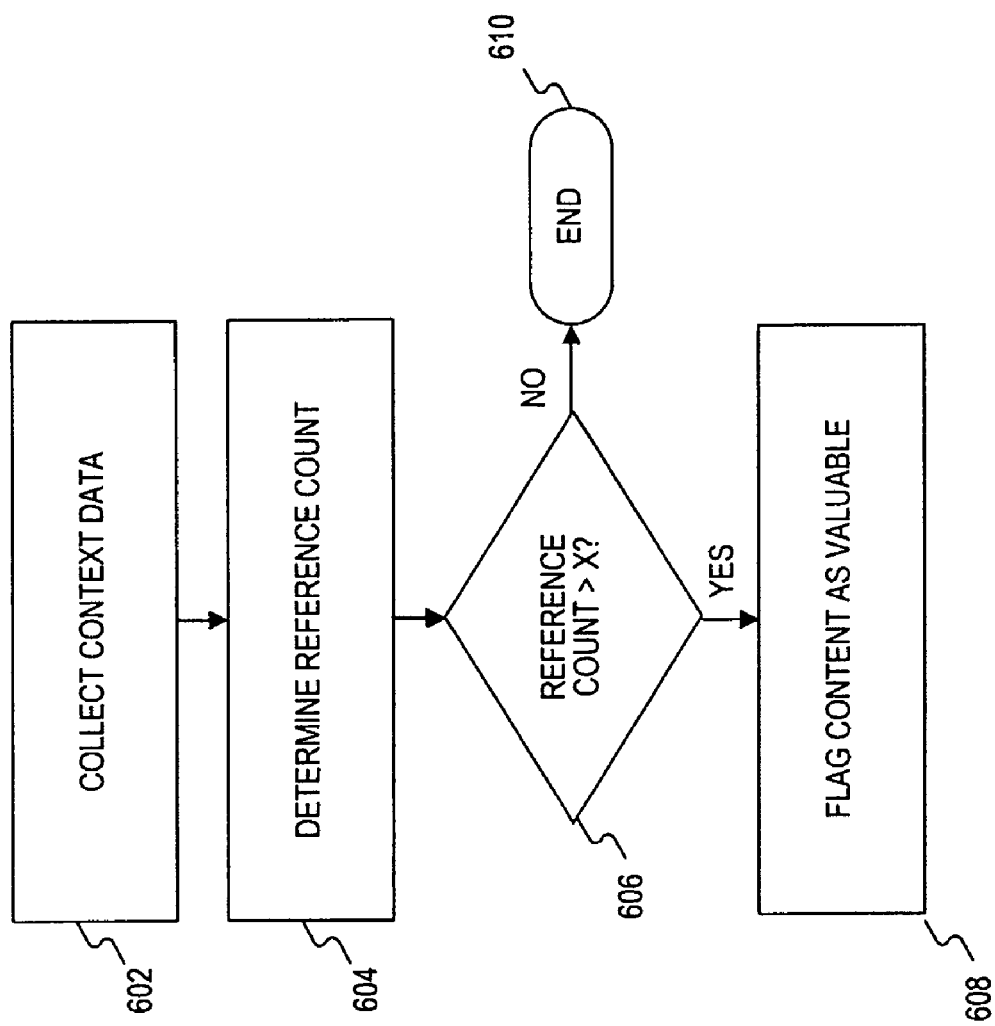
FIGS. 6-7 provide flowcharts illustrating exemplary methods for determining valuable content using contexts, consistent with embodiments of the present invention.

FIG. 6 illustrates an exemplary embodiment for determining the value of content based on context. A software provider 110, for example, may collect the context data for a certain content module 001-012. (Stage 602) From the context data 120, the provider may determine the reference count of the content. (Stage 604) As indicated above, the reference count may represent the number of times a module 001-012 has been referenced. Accordingly, if a module 001-012 is referenced a large number of times, that particular content may be especially valuable. Therefore, if it is determined that the reference count for a content is greater than a certain threshold value (X) (Stage 606) the provider may flag the module to indicate it potentially as valuable content (Stage 608). Otherwise, the module may be not be flagged and the process may end (Stage 610).

Figure 7:
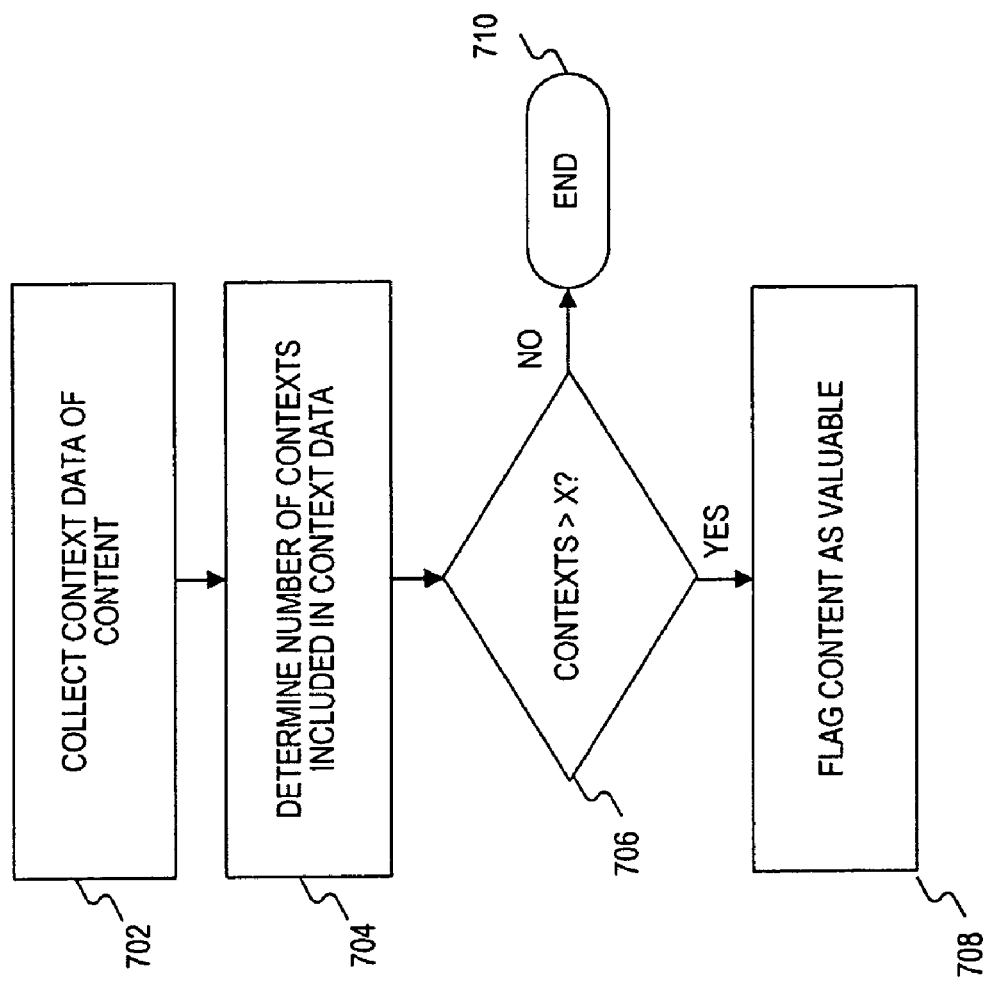

FIG. 7 illustrates an exemplary embodiment for determining the value of content based on context. A software provider 110, for example, may retrieve or collect the context data for a certain content module 001-012 (Stage 702). From the context data, the provider may determine the number of contexts included in the context data (Stage 704). If a module 001-012 is included in a large number of contexts, that particular content may be especially valuable. Therefore, if it is determined that the number of contexts for the content is greater than a certain threshold value (X) (Stage 706), the module may be flagged to indicate it as potentially a valuable content (Stage 708). Otherwise, the module may be not be flagged and the process may end (Stage 710).

Note that, although the processes shown in FIGS. 6 and 7 are illustrated independently, the processes of FIGS. 6 and 7 may be combined within a single process for ascertaining the value of a content module.

Figure 8:
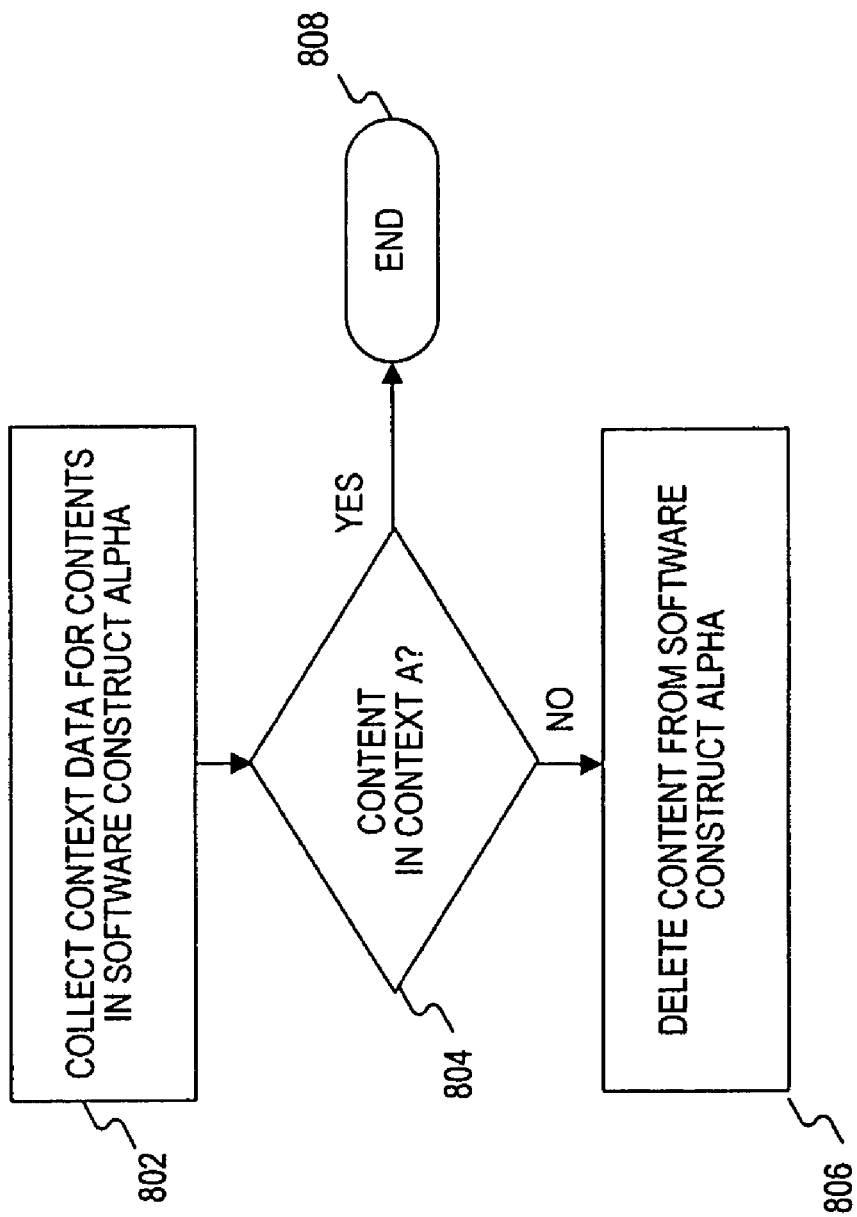
FIG. 8 provides a flowchart illustrating an exemplary method for removing unused content using contexts, consistent with an embodiment of the present invention.

FIG. 8 illustrates an exemplary process for deleting unused content 118 from a software construct 122 based on context, in accordance with an embodiment of the invention. A provider 110, for example, may collect context data 120 for content in a certain software construct 122 (Stage 802). Next, the provider 110 may determine whether each of the content modules 001-012 of the software construct is associated with the context of the software construct (Stage 804). If a certain content module 001-012 is included in the software construct, but the context data 120 associated with the module does not list the context of the particular software construct 122, the content may be unnecessary for the software construct and, as a result, be deleted from the software construct (Stage 806). If the content is not used in any other contexts it can be deleted physically. To determine whether an entity can be deleted physically or only marked as deleted within the origin context, it is necessary only to look on all context directly inherited from this origin context, because if a content module 001-012 is not used within the secondary contexts it can also not be used in all other contexts inherited from these contexts.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer and/or programmer. The various programs or program content can be created using any of the techniques known to one skilled in the art or can be designed in connection with existing software. For example, programs or program content can be designed in or by means of Java, C++, HTML, XML, or HTML with included Java applets or in SAP R/3 or ABAP. One or more of such content can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

As disclosed herein, embodiments and features of the invention may be implemented through computer-hardware and/or software. Such embodiments may be implemented in various environments, such as networked and computing-based environments with one or more users. The present invention, however, is not limited to such examples, and embodiments of the invention may be implemented with other platforms and in other environments.

By way of example, embodiments of the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage mediums and databases referred to herein symbolize elements that temporarily or permanently store data and instructions. Although storage functions may be provided as part of a computer, memory functions can also be implemented in a network, processors (e.g., cache, register), or elsewhere. While examples of databases have been provided herein, various types of storage mediums can be used to implement features of the invention, such as a read only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments of the invention may also be embodied in computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network can be a wired or a wireless network. To name a few network implementations, the network is, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is therefore intended that the specification and examples be considered as exemplary only, with a true scope and spirit of the invention being indicated by the following claims.

What is claimed is:

1. A method comprising:

selecting a context from a plurality of contexts associated with a plurality of hierarchical software constructs, the context defining a class of content modules included in a construct of the plurality of hierarchical software constructs;

retrieving context data for each content module of a plurality of content modules for each software construct of a plurality of hierarchical software constructs, the context data including a primary context identifier identifying a primary context in which the content module was created or modified, at least one secondary context identifier identifying additional secondary contexts in which the content module is permitted to be included, a restriction identifier identifying a class of contexts in which the content module may be used, and a reference count value indicating a number of times the content module is referenced in the plurality of hierarchical software constructs;

determining, based on the primary and the at least one secondary context identifiers, whether each content module is permitted in the selected context;

determining the reference count value as the number of times the content module is used in the plurality of hierarchical software constructs;

storing the reference count value in association with the context data in at least one memory;

identifying the content of the content module as valuable content if the reference count value exceeds a threshold value;

generating a collection of content modules from the class of content modules based on the selected context, the collection including the plurality of content modules permitted in the selected context based on the determination; and storing the collection in the at least one memory.

2. The method of claim 1, wherein inclusion of a content module in a secondary context of the additional secondary contexts is dependent upon the primary context.

3. The method of claim 2, wherein a content module is excluded from the secondary context if the content module is not included in the primary context.

4. The method of claim 3, wherein the restriction identifier identifies the content of the content module as deleted and, based on the restriction identifier, access to the content of the content module is only permitted in the primary context identified by the primary context identifier.

5. The method of claim 3, wherein the restriction identifier identifies the content of the content module as final content and, based on the restriction identifier, modification of the content of the content module is disabled in all contexts identified in the context data except the context of a namespace.

6. The method of claim 3, wherein the restriction identifier identifies the content of the content module as private content and, based on the restriction identifier, accessing the content of the content module is only permitted in all contexts identified in the context data.

7. The method of claim 1, further comprising:
determining, based on the context data, the number of contexts associated with the content of the content module; and
identifying the content of the content module as valuable content if the number of contexts associated with the content of the content module exceeds a threshold value.

8. The method of claim 1, wherein the context defines a class of content modules associated with a particular deployment of one of the plurality of hierarchical software constructs.

9. The method of claim 1, wherein the plurality of hierarchical software constructs are related by an inheritance sequence whereby the availability of an inherited content module is restricted based on the context of the content of the content module superior in the inheritance sequence.

10. A system comprising:
at least one processor; and
at least one memory,
wherein the at least one processor and the at least one memory provide operations comprising:
selecting a context from a plurality of contexts associated with a plurality of hierarchical software constructs, the context defining a class of content modules included in a construct of the plurality of hierarchical software constructs;
retrieving context data for each content module of a plurality of content modules for each software construct of a plurality of hierarchical software constructs, the context data including a primary context identifier identifying a primary context in which the content module was created or modified, at least one secondary context identifier identifying additional secondary contexts in which the content module is permitted to be included, a restriction identifier identifying a class of contexts in which the content module may be used, and a reference count value indicating a number of times the content module is referenced in the plurality of hierarchical software constructs;
determining, based on the primary and the at least one secondary context identifiers, whether each content module is permitted in the selected context;
determining the reference count value as the number of times the content module is used in the plurality of hierarchical software constructs;
storing the reference count value in association with the context data;
identifying the content of the content module as valuable content if the reference count value exceeds a threshold value;
generating a collection of content modules from the class of content modules based on the selected context, the collection including the plurality of content modules permitted in the selected context based on the determination; and
storing the collection.

11. The system of claim 10, wherein inclusion of a content module in a secondary context of the additional secondary contexts is dependent upon the primary context.

12. The system of claim 11, wherein a content module is excluded from the secondary context if the content module is not included in the primary context.

13. The system of claim 12, wherein the restriction identifier identifies the content of the content module as deleted and, based on the restriction identifier, access to the content of the content module is only permitted in the primary context identified by the primary context identifier.

14. The system of claim 12, wherein the restriction identifier identifies the content of the content module as final content and, based on the restriction identifier, modification of the content of the content module is disabled in all contexts identified in the context data except the context of a namespace.

15. The system of claim 12, wherein the restriction identifier identifies the content of the content module as private content and, based on the restriction identifier, accessing the content of the content module is only permitted in all contexts identified in the context data.

16. The system of claim 10, further comprising:
determining, based on the context data, the number of contexts associated with the content of the content module; and
identifying the content of the content module as valuable content if the number of contexts associated with the content of the content module exceeds a threshold value.

17. The system of claim 10, wherein the context defines a class of content modules associated with a particular deployment of one of the plurality of hierarchical software constructs.

18. The system of claim 10, wherein the plurality of hierarchical software constructs are related by an inheritance sequence whereby the availability of an inherited content module is restricted based on the context of the content of the content module superior in the inheritance sequence.

19. An article comprising a non-transitory computer-readable medium storing instructions that, when executed by at least one processor, cause the at least one processor to perform operations comprising:
selecting a context from a plurality of contexts associated with a plurality of hierarchical software constructs, the context defining a class of content modules included in a construct of the plurality of hierarchical software constructs;
retrieving context data for each content module of a plurality of content modules for each software construct of a plurality of hierarchical software constructs, the context data including a primary context identifier identifying a primary context in which the content module was created or modified, at least one secondary context identifier identifying additional secondary contexts in which the content module is permitted to be included, a restriction identifier identifying a class of contexts in which the content module may be used, and a reference count value indicating a number of times the content module is referenced in the plurality of hierarchical software constructs;

determining, based on the primary and the at least one secondary context identifiers, whether each content module is permitted in the selected context;

determining the reference count value as the number of times the content module is used in the plurality of hierarchical software constructs;

storing the reference count value in association with the context data;

identifying the content of the content module as valuable content if the reference count value exceeds a threshold value;

generating a collection of content modules from the class of content modules based on the selected context, the collection including the plurality of content modules permitted in the selected context based on the determination; and storing the collection.

* * * * *